United States Patent
Reed

(10) Patent No.: US 12,099,444 B2
(45) Date of Patent: Sep. 24, 2024

(54) CAT AWARE LOADS AND SOFTWARE PREFETCHES

(71) Applicant: CENTAUR TECHNOLOGY, INC., Austin, TX (US)

(72) Inventor: Douglas Raye Reed, Austin, TX (US)

(73) Assignee: CENTAUR TECHNOLOGY, INC., Austin, TX (US)

(*) Notice: Subject to any disclaimer, the term of this patent is extended or adjusted under 35 U.S.C. 154(b) by 7 days.

(21) Appl. No.: 17/581,616

(22) Filed: Jan. 21, 2022

(65) Prior Publication Data

US 2023/0236973 A1 Jul. 27, 2023

(51) Int. Cl.
| | |
|---|---|
| G06F 12/08 | (2016.01) |
| G06F 9/30 | (2018.01) |
| G06F 9/455 | (2018.01) |
| G06F 12/0811 | (2016.01) |
| G06F 12/0862 | (2016.01) |
| G06F 12/0871 | (2016.01) |

(52) U.S. Cl.
CPC ...... *G06F 12/0811* (2013.01); *G06F 9/30043* (2013.01); *G06F 9/30047* (2013.01); *G06F 9/45558* (2013.01); *G06F 12/0862* (2013.01); *G06F 12/0871* (2013.01); *G06F 2009/45583* (2013.01)

(58) Field of Classification Search
CPC ............. G06F 12/0811; G06F 12/0862; G06F 12/0871; G06F 9/45558; G06F 2009/45583; G06F 9/30043; G06F 9/30047; G06F 2212/1024; G06F 2212/152; G06F 2212/454; G06F 2212/455; G06F 2212/502; G06F 9/30185; G06F 9/383; G06F 12/0857; G06F 12/0864; G06F 12/0888; G06F 12/084; G06F 12/0842
USPC ........................................................ 711/118
See application file for complete search history.

(56) References Cited

U.S. PATENT DOCUMENTS

| | | | |
|---|---|---|---|
| 9,811,471 | B2 | 11/2017 | Jenne et al. |
| 2019/0310943 | A1* | 10/2019 | Noll ................... G06F 16/2282 |
| 2020/0301840 | A1 | 9/2020 | Reed et al. |
| 2021/0026769 | A1* | 1/2021 | Bhandaru ............... G06F 9/547 |

(Continued)

OTHER PUBLICATIONS

Improving Real-Time Performance by Utilizing Cache Allocation Technology, Intel® White Paper, Apr. 2015.

(Continued)

*Primary Examiner* — Hua J Song
(74) *Attorney, Agent, or Firm* — McClure, Qualey & Rodack, LLP

(57) ABSTRACT

In one embodiment, a method of selectively reserving portions of a last level cache (LLC) for a multi-core processor, the method comprising: allocating, by an executive system, plural classes of service to the portions of the LLC, wherein the portions comprise ways, and wherein each of the plural classes of service are allocated to one or more of the ways; assigning, by the executive system, one of the plural classes of service to an application as a default class of service, wherein the assignment controls which of the ways the application can allocate into; and overriding, by the application, the default class of service to enable allocation by the application to the one or more of the ways associated with a non-default class of service.

20 Claims, 4 Drawing Sheets

(56) References Cited

U.S. PATENT DOCUMENTS

2021/0157739 A1* 5/2021 Gholkar ............... G06F 12/126
2021/0349831 A1* 11/2021 Cooray ............... G06F 9/3009

OTHER PUBLICATIONS

Section 17.19, Intel® 64 and TA-32 Architectures Software Developer's Manual (SDM), vol. 3 (3A, 3B, 3C, & 3D),System Programming Guide (Jun. 2021), accessible on Jan. 7, 2022 via the following link with pertinent section attached: https://url.emailprotection.link/?bgfzlA7BcqxowKX4Z9uZqShTzwBYkeFR1X-oCXx24-zNNrhgxMYNNU6ycfIM7NJXf3XJwmLrngqWDB6g9WQ-j1s_3EVp2sNgFVZ7KNLxzsjdwimfKVYUTzW4LLIXdUKLvXDmKNrPet9pKpoY1-5LuOjDn6504Gpflq4bBpZVSBhYTy.

X86-64 Instruction Encoding, OSDev.org, accessible on Jan. 7, 2022 via the following link with the pertinent section attached: https://url.emailprotection.link/?bUyfMcVVFVlcd2kp2phF6F_BRNFOoynIS9-9E0kQ5v7MDX1eR0En8_ytsqXn4ZOmUVu3p2DmGCE4EKI5XjHg9af6JVX9M5PJJekbDFnJHXWcDevyp0htDez-V69vHheDnw0h1C_Vbhluef1R00fguEWouDjt5X_TS4-Ni4muOE50~.

* cited by examiner

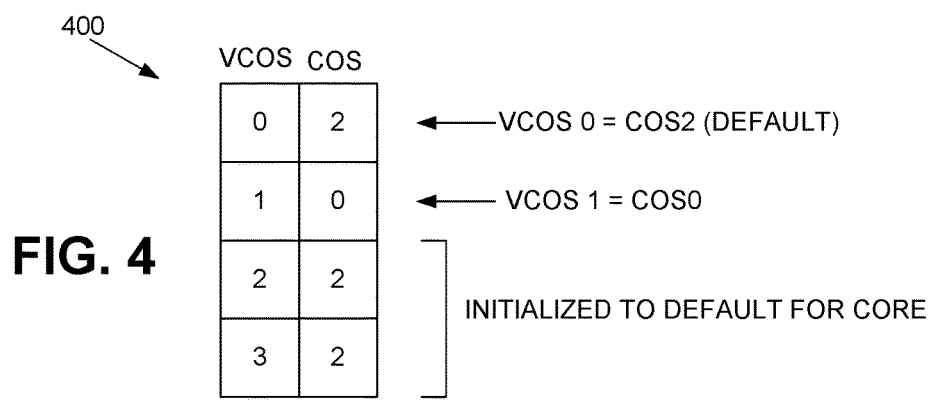
FIG. 3
FIG. 4
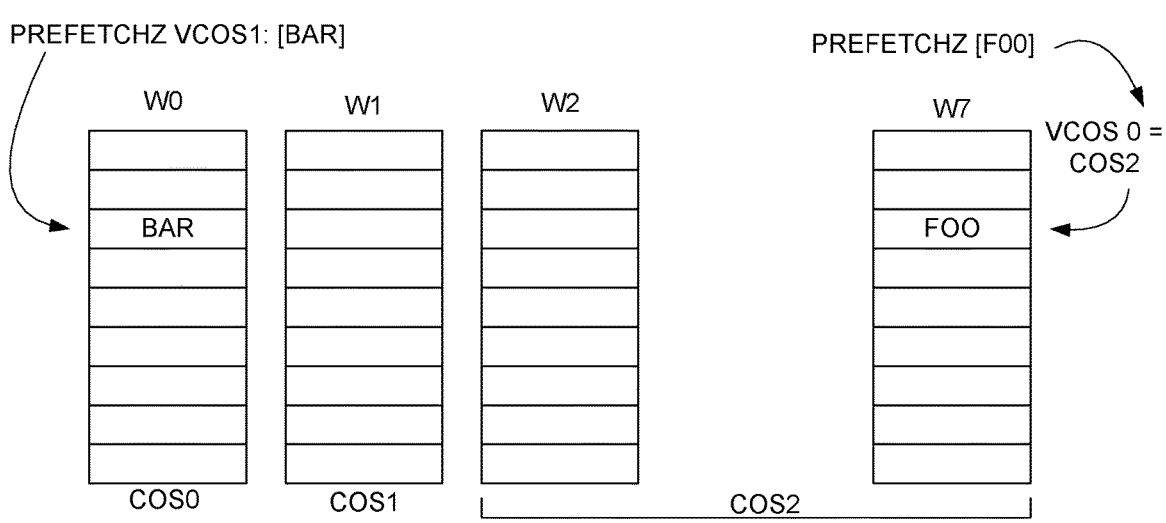
FIG. 5

CAT AWARE LOADS AND SOFTWARE PREFETCHES

TECHNICAL FIELD

The present invention relates in general to cache management, and in particular, cache allocation technology.

BACKGROUND

Most modern computer systems include a microprocessor that performs the computations necessary to execute software programs. Computer systems also include other devices connected to (or internal to) the microprocessor, such as memory. The memory stores the software program instructions to be executed by the microprocessor. The memory also stores data that the program instructions manipulate to achieve the desired function of the program.

The devices in the computer system that are external to the microprocessor (or external to a processor core), such as the memory, are directly or indirectly connected to the microprocessor (or core) by a processor bus. The processor bus comprises a collection of signals that enable the microprocessor to transfer data in relatively large chunks. When the microprocessor executes program instructions that perform computations on the data stored in the memory, the microprocessor fetches the data from memory into the microprocessor using the processor bus. Similarly, the microprocessor writes results of the computations back to the memory using the processor bus.

The time required to fetch data from memory or to write data to memory is many times greater than the time required by the microprocessor to perform the computation on the data. Consequently, the microprocessor inefficiently waits idle for the data to be fetched from memory. To reduce this problem, modern microprocessors include at least one cache memory. The cache memory, or cache, is a memory internal to the microprocessor (or processor core)—typically much smaller than the system memory—that stores a subset of the data in the system memory. When the microprocessor executes an instruction that references data, the microprocessor checks to see if the data is present in the cache and is valid. If so, the instruction can be executed more quickly than if the data had to be retrieved from system memory since the data is already present in the cache. That is, the microprocessor does not have to wait while the data is fetched from the memory into the cache using the processor bus. The condition where the microprocessor detects that the data is present in the cache and valid is commonly referred to as a cache hit. The condition where the referenced data is not present in the cache is commonly referred to as a cache miss. When the referenced data is already in the cache memory, significant time savings are realized, by avoiding the extra clock cycles required to retrieve data from external memory.

In some microprocessors, the cache is actually made up of multiple caches. The multiple caches are arranged in a hierarchy of multiple levels. For example, a microprocessor may have two caches, referred to as a first-level (L1) cache and a second-level (L2) cache. The L1 cache is closer to the computation elements of the microprocessor than the L2 cache. That is, the L1 cache is capable of providing data to the computation elements faster than the L2 cache. The L2 cache is commonly larger and has more storage resources than the L1 cache. Some microprocessors may have a third cache (L3), which may be larger than the L2 cache. The L3 cache is sometimes referred to as a last level cache (LLC), and is a shared cache that is fully accessible and utilized by all cores of a microprocessor. In many microprocessors, the LLC is an inclusive cache (e.g., includes all of the data stored in the lower level (L1, L2) caches). As cores request data from memory, a copy is placed in each of the caches. Cache misses for requests to a lower level cache may be satisfied along the hierarchy of higher level caches (hits), or if not, system memory is accessed to fulfill the request. As cores use the shared LLC, least recently used (LRU) algorithms may evict cache lines from the LLC, which means that the copies in the lower level caches of the cores are invalidated.

Even programs with good data locality will at times need to access a cache line that is not in the cache, where latency is introduced while the data is fetched from main memory. Prefetching reduces this latency by loading the data into the cache before it is needed, and includes software prefetching and hardware prefetching. With hardware prefetching, the processor monitors memory access patterns of the running program and tries to predict what data the program will access next and then prefetches that data. Known techniques for hardware prefetching include bounding box prefetching and the less complex stream prefetching. With software prefetching, a programmer or compiler inserts prefetch instructions into the program, which initiates a load of a cache line into the cache without incurring a stall while waiting for the data to arrive. Processors that have multiple levels of caches often have different prefetch instructions for prefetching data into different cache levels. This can be used, for example, to prefetch data from main memory to the L2 cache far ahead of the use with an L2 prefetch instruction, and then prefetch data from the L2 cache to the L1 cache just before the use with a L1 prefetch instruction.

One hurdle with software prefetching is if the prefetch is too far ahead of the instruction using the prefetched data, the prefetched cache line will instead already have been evicted again before the data is actually used. The instruction using the data will then cause another fetch of the cache line and have to stall. This not only eliminates the benefit of the prefetch instruction, but introduces additional costs since the cache line is now fetched twice from main memory or the next cache level. This increases the memory bandwidth requirement of the program.

Additionally, the need to access memory arises with this turnover among cache lines in the LLC when there are competing interests among the cores of the microprocessor. For instance, with certain applications (e.g., database applications, streaming application), a large portion of the LLC may be rapidly overwritten with new data, which causes significant portions of some lower level caches to be evicted. If one or more cores is running a relatively higher priority application, data in L1 caches of these higher priority cores may be overwritten, requiring fetches from memory and reducing performance.

Intel® Cache Allocation Technology (CAT) may be used to mitigate some of the aforementioned problems. As is known, CAT involves the defining and assigning of a class of service to each core, where an executive system (e.g., an Operating System (OS), or Hypervisor/Virtual Machine Manager (VMM)) assigns the LLC to particular cores (e.g., running applications) by limiting the amount of the LLC into which each core is able to allocate cache lines. Through this allocation of cache lines into assigned portions of the cache (e.g., ways of the cache), the core cannot evict cache lines outside of the assigned portions. As disclosed in part in Section 17.19.1 of Intel® 64 and IA-32 Architectures Software Developer's Manual (SDM), Volume 3 (3A, 3B, 3C, &

3D), System Programming Guide (June 2021), the CAT mechanisms defined in the SDM provide the following key features: a mechanism to enumerate platform Cache Allocation Technology capabilities and available resource types that provides CAT control capabilities. For implementations that support Cache Allocation Technology, CPUID provides enumeration support to query which levels of the cache hierarchy are supported and specific CAT capabilities, such as the max allocation bitmask size; a mechanism for the OS or Hypervisor to configure the amount of a resource available to a particular Class of Service via a list of allocation bitmasks; mechanisms for the OS or Hypervisor to signal the Class of Service to which an application belongs; and hardware mechanisms to guide the LLC fill policy when an application has been designated to belong to a specific Class of Service.

In Section 17.19.2 of the SDM, it is noted in part that Cache Allocation Technology comprises: an architecturally exposed mechanism using CPUID to indicate whether CAT is supported, and what resource types are available which can be controlled; for each available resource Type, CPUID also enumerates the total number of Classes of Services and the length of the capacity bitmasks that can be used to enforce cache allocation to applications on the platform; an architecturally exposed mechanism to allow the execution environment (OS/VMM) to configure the behavior of different classes of service using the bitmasks available; an architecturally exposed mechanism to allow the execution environment (OS/VMM) to assign a CoS (Class or Classes of Service) to an executing software thread (i.e. associating the active CR3 of a logical processor with the CoS in IA32_PQR_ASSOC); implementation-dependent mechanisms to indicate which CoS is associated with a memory access and to enforce the cache allocation on a per CoS basis.

Though CAT may be used to mitigate some of the software prefetching and L3 thrashing-related problems described above, further improvements are desired as today's microprocessors are called upon to perform a seemingly ever-expanding list of applications and processing performance benchmarks.

SUMMARY

In one embodiment, a method of selectively reserving portions of a last level cache (LLC) for a multi-core processor, the method comprising: allocating, by an executive system, plural classes of service to the portions of the LLC, wherein the portions comprise ways, and wherein each of the plural classes of service are allocated to one or more of the ways; assigning, by the executive system, one of the plural classes of service to an application as a default class of service, wherein the assignment controls which of the ways the application can allocate into; and overriding, by the application, the default class of service to enable allocation by the application to the one or more of the ways associated with a non-default class of service.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

FIG. 3 is a schematic diagram that illustrates an example CoS allocation bitmap.

FIG. 4 is a schematic diagram that illustrates an example Virtual CoS Table for an example core.

FIG. 5 is a schematic diagram that illustrates an example CoS to ways assignment with a default and an override mechanism, in accordance with one embodiment.

DETAILED DESCRIPTION

Figure 1:
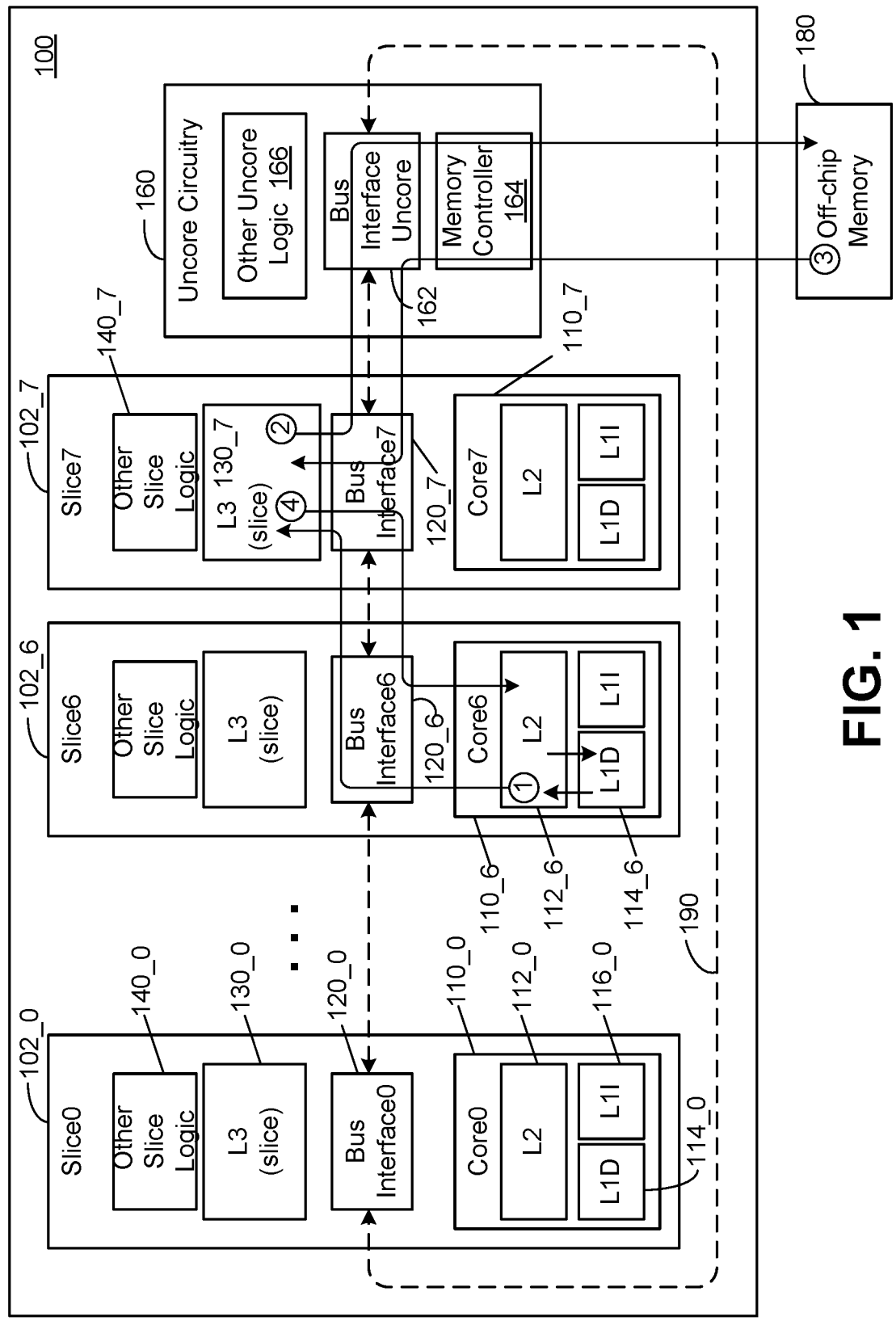
FIG. 1 is a block diagram that illustrates an example microprocessor in which an embodiment of a Cache Allocation Technology (CAT) aware load and software prefetch system is implemented.

Certain embodiments of a Cache Allocation Technology (CAT) aware load and software prefetch system of a multi-core microprocessor, and associated methods, are disclosed that provide a mechanism for an executing software thread (as opposed to an executive system, including specifically an Operating System (OS) or Hypervisor/Virtual Machine Manager (VMM)) to control a Class of Service (CoS) associated with an instruction on a per-instruction basis. In some embodiments, the CAT aware load and software prefetch system additionally or alternatively provides for a level of indirection wherein the OS configures a VCoS (Virtual Class of Service) table separate from the allocation bitmasks, where the VCoS table specifies a mapping between a defined number of VCoSs and the CoSs configured by the OS (i.e., the rows in the allocation bitmask table). For instance, the OS/VMM may specify that a thread has a CoS of 3, but can also use a CoS of 4 (e.g., through the virtual table), and an instruction prefix override may select between either of CoS of 3 or CoS of 4 (e.g., but cannot use, say, CoS of 0-2 or 5-15).

Digressing briefly, the eviction of cache lines from the shared third level (L3) cache, or last level cache, may result in a program running on a core(s) not having cache lines needed for operation due to thrashing and concomitant invalidation of the lower level caches, necessitating the need to fetch (and/or prefetch) cache lines from memory, resulting in increased latency and diminished performance. Though CAT may mitigate some of the performance issues, CAT still associates a subset of L3 ways with one of N (e.g., eight) Classes of Services, where applications are given a CoS by the OS/VMM which controls which ways they can allocate into. That is, normally, an application is given a CoS (default class of service) by the OS when it is first scheduled on a processor core. This CoS is used to select an allocation bitmask from the allocation bitmask table, which the OS has also configured. The allocation bitmask constrains new allocations to a subset of the cache resources (e.g. the ways of the cache) for the cache that is implementing CAT, which may not offer the flexibility or efficiency that an application-level assignment may provide. In contrast, certain embodiments of a CAT aware load and software prefetch system allows an application to use one of several CoS, as permitted by the OS. This scheme enables an application to prioritize (or deprioritize) certain accesses that are known to have good (or bad) temporal locality, while still allowing the OS to quiet "noisy neighbors" (e.g., applications/programs running where one application is well-behaved and another is causing persistent thrashing of the L3 cache and hence invalidation of lower level cache data) without allowing them free reign over the cache resources. In effect, through this mechanism, applications are enabled to explicitly override the default CoS to allow allocations to non-default ways.

Having summarized certain features of a CAT aware load and software prefetch system of the present invention, reference will now be made in detail to the description of a CAT aware load and software prefetch system as illustrated in the drawings. While a CAT aware load and software prefetch system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" (and similarly with "comprise", "comprising", and "comprises") mean including (comprising), but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons of ordinary skill in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit (e.g., VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

FIG. 1 is a block diagram showing an example microprocessor in which an embodiment of a CAT aware load and software prefetch system is implemented. As will be described herein, the present invention is directed to an extension of CAT, where applications are provided with the ability to override the default CoS. One example architecture is described below, in which the CAT aware load and software prefetch system may be utilized. In this regard, reference is now made to FIG. 1, which is a diagram illustrating a multi-core microprocessor 100. As will be appreciated by persons having ordinary skill in the art from the description provided herein, the present invention may be implemented in a variety of circuit configurations and architectures, and the architecture illustrated in FIG. 1 is merely one of many suitable architectures. Specifically, in the embodiment illustrated in FIG. 1, the microprocessor 100 is an eight-core processor, wherein the cores are enumerated core0 110_0 through core7 110_7. In the illustrated embodiment, numerous circuit components and details are omitted, which are not germane to an understanding of the present invention. As will be appreciated by persons having ordinary skill in the art, each processing core (110_0 through 110_7) includes certain associated or companion circuitry that is replicated throughout the microprocessor 100. Each such related sub-circuit is denoted in the illustrated embodiment as a slice. With eight processing cores 110_0 through 110_7, there are correspondingly eight slices 102_0 through 102_7. Other circuitry that is not described herein is merely denoted as "other slice logic" 140_0 through 140_7.

In the illustrated embodiment, a three-level cache system is employed, which includes a level-one (L1) cache, a level-two (L2) cache, and a level-three (L3) cache. The L1 cache is separated into both a data cache and an instruction cache, respectively denoted as L1D and L1I. The L2 cache also resides on core, meaning that both the L1 cache and the L2 cache are in the same circuitry as the core of each slice. That is, each core of each slice has its own dedicated L1D, L1I, and L2 caches. Outside of the core, but within each slice is an L3 cache. In one embodiment, the L3 cache 130_0 through 130_7 (also collectively referred to herein as 130) is a distributed cache, meaning that ⅛th of the L3 cache resides in slice0 102_0, ⅛th of the L3 cache resides in slice1 102_1, etc. In one embodiment, each L1 cache is 32 k in size, each L2 cache is 256 k in size, and each slice of the L3 cache is 2 megabytes in size. Thus, the total size of the L3 cache is 16 megabytes. Note that other individual or aggregate cache sizes may be used in some embodiments.

Bus interface logic 120_0 through 120_7 is provided in each slice to manage communications from the various circuit components among the different slices. As illustrated in FIG. 1, a communication bus is 190 is utilized to allow communications among the various circuit slices, as well as with uncore circuitry 160. The uncore circuitry 160 merely denotes additional circuitry that is on the processor chip, but is not part of the core circuitry associated with each slice. As with each illustrated slice, the un-core circuitry 160 includes a bus interface circuit 162. Also illustrated is a memory controller 164 for interfacing with off-processor (off-chip) memory 180. Finally, other un-core logic 166 is broadly denoted by a block, which represents other circuitry that may be included as a part of the un-core processor circuitry (and again, which need not be described for an understanding of the invention).

To better illustrate certain inter and intra communications of some of the circuit components, the following example will be presented. This example illustrates communications associated with a hypothetical load miss in core6 cache. That is, this hypothetical assumes that the processing core6 110_6 is executing code that requests a load for data at hypothetical address 1000. When such a load request is encountered, the system first performs a lookup in L1D 114_6 to see if that data exists in the L1D cache. Assuming that the data is not in the L1D cache, then a lookup is performed in the L2 cache 112_6. Again, assuming that the data is not in the L2 cache, then a lookup is performed to see if the data exists in the L3 cache. As mentioned above, the L3 cache is a distributed cache, so the system first needs to determine which slice of the L3 cache the data should reside in, if in fact it resides in the L3 cache. As is known, this process can be performed using a hashing function, which is merely the exclusive ORing of bits, to get a three-bit address (sufficient to identify which slice—slice 0 through slice 7—the data is stored in).

In keeping with the example, assume this hashing function results in an indication that the data, if present in the L3 cache, would be present in that portion of the L3 cache residing in slice7. A communication is then made from the L2 cache of slice6 102_6 through bus interfaces 120_6 and 120_7 to the L3 cache present in slice7 102_7. This communication is denoted in the figure by the encircled number 1. If the data was present in the L3 cache, then it would be communicated back from the L3 cache 130_7 to the L2 cache 112_6. However, and in this example, assume that the data is not in the L3 cache either, resulting in a cache miss. Consequently, a communication is made from the L3 cache 130_7 through bus interface7 120_7 through the un-core bus interface 162 to the off-chip memory 180, through the memory controller 164. This communication is denoted in the figure by the encircled number 2. A cache line that includes the data residing at address 1000 is then communicated from the off-chip memory 180 back through memory controller 164 and un-core bus interface 162 into the L3 cache 130_7. This communication is denoted in the figure by the encircled number 3. After that data is written into the L3 cache, it is then communicated to the requesting core, core6 110_6 through the bus interfaces 120_7 and 120_6. This communication is denoted in the figure by the encircled number 4.

At this point, once the load request has been completed, that data will reside in each of the caches L3, L2, and L1D. With regard to a cache line of each of the L1 caches, in one embodiment the cache line is 64 bytes. Thus, 64 bytes of load data can be loaded per clock cycle. As mentioned above, in one embodiment, the L2 cache is preferably 256 KB in size.

Before proceeding with a description of a CAT aware load and software prefetch system, the following is a brief illustration of what is sometimes referred to as a noisy neighbor issue that CAT is intended at least in part to address. Assume a shared L3 cache (e.g., L3 cache 130) and two programs are running on 2 different cores (e.g., core0 110_0 and core1 110_1). Assume the core0 program is very well behaved (e.g., doing small matrix operations, and all the matrices are handled efficiently in the L3 cache), and assume the program in core1 is behaving obnoxiously from a cache perspective. For instance, the program in core1 may be scanning through a big region of memory and never returning to reuse anything, so it has no temporal locality—basically every access is going to be a cache miss that causes an allocation back to the cache, it will evict something useful that core0 was working on, and the new data brought in is basically useless (e.g., reading through a file, not returning to something previously read, and if returned, it may have already been evicted). An example of such an application on core1 may be a streaming application, or a database application. On database applications, accesses are often very random, very spread apart, with no discernible pattern to enable prefetches. This example is illustrative of the noisy neighbor problem, where core0 is well behaved with its working set fitting in the caches, and the noisy neighbor—core1—is very noisy, always thrashing the cache, evicting all useful data of core0 which the latter performs best when such data is kept in the cache. As explained above, Intel® CAT is an approach to address the noisy neighbor problem, where CAT defines a number of classes of service (CoS). As is known, and with reference to Table 17.27 of the above-mentioned SDM, the CoS is a table, where cache capacity bitmasks (treating the columns as ways and the rows as CoS, which shows 4 CoS as an example), all 4 CoS can access all ways (default). Or, as shown in the overlapped bitmask, the CoS0 can access all ways, CoS1 can only access ways 0-3, CoS2 only has ways 0 and 1, and CoS3 only has way 0. In the isolated bitmask example, CoS0 accesses half of the cache (ways 4-7), and CoS1 access a quarter of the cache (ways 2 and 3), and CoS2 and CoS3 each have one way. Note that any combination is acceptable, as long as each CoS specifies a contiguous region that it allocates into.

As shown in Figure 17-30 of Intel's® SDM, the CoS is indicated by an MSR (model specific register) referred to as I32_PQR_ASSOC (PQR association). In the cache allocation configuration, the cache capacity bitmask is populated, and for context switching (e.g., switching to an application from another running application, or when an application is running and pre-empted and then now context switching back in), the OS decides for the application switched to that it will have a CoS of, say, 2, so the OS programs CoS of 2 into the I32_PQR_ASSOC. As long as that application is executing, every load or store instruction that it performs is going to have this CoS of 2 associated with it for that particular core handling it. As CAT implementations are known in the industry, further description of the same is omitted here for brevity and to avoid obfuscating certain relevant features of certain embodiments of a CAT aware load and software prefetch system.

Figure 2:
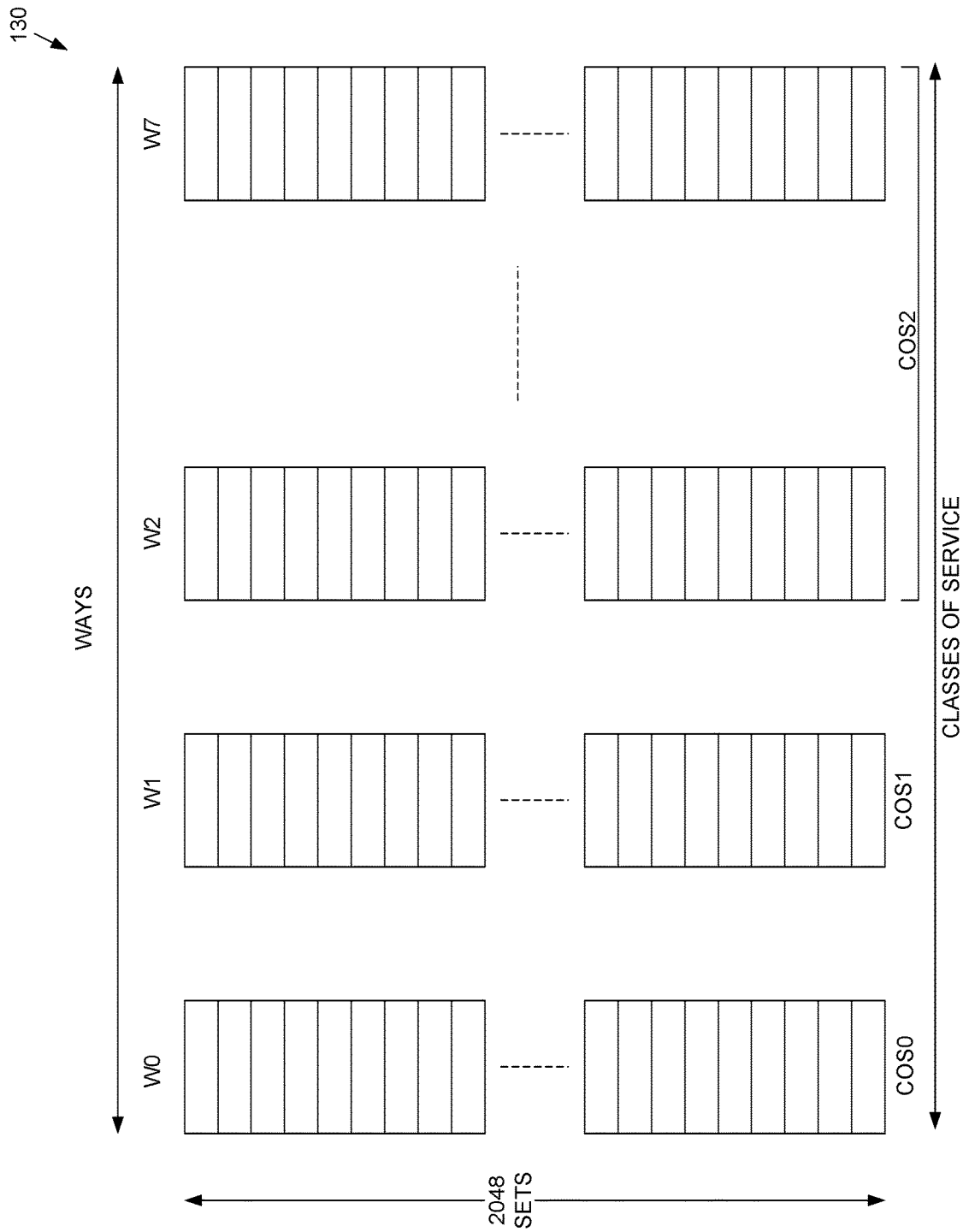
FIG. 2 is a schematic diagram that illustrates a level-3 (L3) cache with an example configuration of 2048 sets and eight (8) ways and corresponding default assignment among eight (8) Classes of Service (CoS) that an embodiment of a CAT aware load and software prefetch system overrides to enable allocation of CoS to non-default ways.

In view of this brief background, reference is made to the FIG. 2, which illustrates an L3 cache 130 with an example configuration/partition of 2048 sets and eight (8) ways, with a corresponding default assignment among three (3) Classes of Service (CoS). Note that three CoS is merely an example, and that other quantities of possible CoS (e.g., eight, sixteen, etc.) may be used. Normally, the CAT mechanisms (via the OS/VMM and the cache capacity bitmasks) associate a subset of the L3 ways with one of N CoS, where N may be eight or other values as is known in the art. In this illustrative example, CoS0 is only allowed to use way0, CoS1 can only use way1, and CoS2 can use any of the other ways (2-7), resulting in three (3) non-overlapping CoS. Assume for this example there is an accelerator on the chip using CoS0 (using way0), and two applications running, one using CoS1 (using way1) and the other using CoS2 (using ways 2-7). Thus, conventionally, CAT associates a subset of the L3 ways with one of N (in this example, N=3) CoS, where applications are given a CoS by the OS, which controls which ways they can allocate into. In this configuration, applications using CoS0 have a distinct L3 capacity when compared to CoS1 or CoS2. If the application running on ways 2-7 wants to load data into the cache on behalf of the accelerator, then conventionally, the applications need to make a call to the OS to change the CoS, which is costly in that there is a call to the OS, a write to the MSR, and once the context switches, codec accesses also are going to go into way0 which may not be desirable (e.g., in the case of a machine learning accelerator, the intent may be to load up an image to perform some transformation before sending it to the accelerator without needing codec accesses).

In certain embodiments of a CAT aware load and software prefetch system, a mechanism is used to allow an application to explicitly override the default CoS (described in the example above) to allow allocations into the non-default ways. One mechanism to achieve this function is to use an instruction prefix that may be added onto a load or a store instruction that explicitly overrides the CoS associated with this instruction. Returning to the machine learning example, where there is a machine learning accelerator (using CoS0) on the chip that is using the same cache and it is configured to just use way0. The application that is running (e.g., CoS2 using ways 2-7) may load an image from DRAM into the L3 cache, maybe decompress the image, and keep this image stored in the L3 cache for the machine learning accelerator. Ideally, the application would load the compressed version of the image into ways 2-7 from memory, which is the area that the application may by default be running in, but for the decompressed image that the application wants the machine learning accelerator to use, the application may desire to store it in way0 because way0 is specifically devoted to the machine learning accelerator, and since operations are to be performed on this image, performance and efficiency metrics demand that the image data is not evicted (e.g., via LRU algorithms out to DRAM or overwritten by other applications).

Accordingly, on load or store instructions to addresses that the machine learning accelerator is going to use in the future (e.g., and hence desirous of placing into way0 for the machine learning accelerator), a CoS override is specified (e.g., via an instruction prefix). By default, the application (CoS2) is running out of ways 2-7, but for these handful of instructions (e.g., performed, say, in a loop given the amount of data), it is desirous that all of these accesses have a CoS of 0 (i.e., CoS0) corresponding to the machine learning accelerator instead of a CoS of 2 (i.e., CoS2). In other words, in this example, the decompressed results are stored with the CoS override indicating CoS0. Note that the example describe-described above lends itself to simple demand requests, but are also extensible to software prefetches. For instance, in the example above, where the application has a default to CoS of 2 to ways 2-7 and the machine learning accelerator has a CoS of 0 (to way0), the CoS2 application may use an instruction prefix to load way0 with data for the accelerator as illustrated in pseudo code below:

; allocates into W2-7
PREFETCHZ [F00];
; allocates into W0
PREFETCHZ CoS0: [F00]

In this example, the application that is running with CoS2 and the machine learning accelerator is configured to use CoS0, where the accelerator is basically being given an eighth of the L3 cache for its data. The application that is running with CoS2 is typically going to be operating within ways 2-7, bringing in an image that is already compressed, not requiring any additional processing, and bringing the image into the L3 cache on behalf of the accelerator. By using this CoS override on the prefetch T2 instruction, which is a prefetch into the last level cache, the override is explicitly saying to go get this data, bring it into the cache, but do it with CoS0 instead of what the default CoS says.

In the example use case described above, the OS still specifies the default CoS, but now with certain embodiments of CAT aware load and software prefetch system, there is an option for an application to override the default CoS, such as if there is a desire to perform requests on behalf of some other processor or co-processor. Yet another use case involves pinning to memory. For instance, assume a streaming workload where after every, say million instructions, it is desirous to return to some region of memory used in the past, and thus the need to keep this region of memory in the cache without it getting evicted by this streaming data. Assume further that CoS0 is the default, and includes ways 0-6, and assume CoS1 is way 7. By default, allocation is always into ways 0-6 with CoS0, but initially, this critical region of memory may be loaded up in CoS1 with the expectation of never allocating into that way 7 again. In other words, the intent is to keep the data there so it is there when returned to it. In one embodiment, this pinning function may be implemented via an augmentation of the LUR LRU algorithm, where the LRU algorithm is treated as an array of ways from least recently used to most recently used. If given a constraint based on the bitmask where, say, ways 0-3 are only allowed to be used, when performing an LRU lookup, instead of looking at the least recently used way, the least recently used way that is permitted according to the CoS is used.

Another embodiment of a CAT aware load and software prefetch system provides for a virtual CoS (vCos), where each application may have a virtual CoS, somewhat similar to having virtual memory. For instance, say the default virtual CoS is always 0, and the OS may operate based on a CoS table that it is actually CoS2. That is, when an application is using vCoS0, the OS has determined that the application is actually getting CoS2. Such a scheme allows the OS to still control which CoS the application is using, but it also gives the application the ability to perform an override when selecting which resource it is using.

Explaining further, in one embodiment, applications may use any or all of, for example, four (4) virtual classes of service (vCoS), the default of which for any application is VCoS0. In one embodiment, the OS always programs vCoS0 to be the default CoS for code and/or data accesses. If the OS programs all other vCoS entries the same way, it effectively disables the application vCoS override (by forcing it to always select the same CoS for all legal vCoS). However, the OS may program certain vCoS to map to other CoSs that the application can legally use. For example, an application may read image data from DRAM into the cache, modify the data, and keep it "pinned" in the cache for use by a coprocessor. The initial loads from DRAM into the cache of data that is only needed by the core may be issued with the default CoS for the application. When the core stores the modified image data for use by the coprocessor, it may use the vCoS override to force the written data into the ways corresponding to the CoS for the coprocessor.

One example of a CoS bitmask allocation table 300 is shown in FIG. 3, where each CoS has a bitmask allocation for eight (8) ways as an illustrative example, and where the bitmask allocates CoS0 to way0, CoS1 to way1, and CoS2 to ways 2-7. As reflected by the top entry, the OS may decide that the application running on core0 is CoS2 by default, yet is allowed to use CoS0.

An example vCoS table 400 for core0 is shown in FIG. 4. As illustrated in FIG. 4, the first entry of the table 400 reflects that the default vCoS of 0 is equal to a CoS of 2. The second entry reflects that VCoS of 1 is equal to CoS of 0 (e.g., for the coprocessor). The subsequent entries reflect that the unused VCoS 2 and 3 are initialized to a default for the core. The software implicitly uses vCoS0, but can override it. An example of pseudo code for software prefetching is as follows:
; allocates into W2-7
PREFETCHZ [F00];
; allocates into W0
PREFETCHZ vCOS1: [BAR];

As schematically illustrated by the diagram 500 in FIG. 5, for PREFETCHZ [F00], the software implicitly uses vCoS0=CoS2, yet can override the default via the instruction prefix of vCoS1, which overrides vCoS to use vCoS1=CoS0 (as reflected in the second entry of the vCoS table for core0).

Similarly, the use of virtual CoS for the image data described above may be represented by the following pseudo code (e.g., for load/store or other such instructions):
; load image_data into a way allowed by vCoS0=CoS2
mov eax, [image_data];
; modify data
xor eax, 0xffffffff
; write image_data into a way allowed by vCoS1=CoS0
mov vCoS1: [coproc_data], eax As explained above the override may be implemented with an instruction prefix. For instance, one method may use the known two-byte VEX escape prefix to specify non-zero VCoS in the "vvvv" field, as described in the OSDev.org website for x86-64 instruction encoding. In this case, the instruction may take the form of 110000101 000##000, where ## becomes vCoS. Other instruction prefix formats may be used, as should be appreciated by one having ordinary skill in the art in the context of the present disclosure. For instance, software is compiled with a load, store, or software prefetch instruction with a CoS override prefix that is directing the cache hierarchy to use a CoS that overrides a default CoS levied by the OS.

Figure 6:
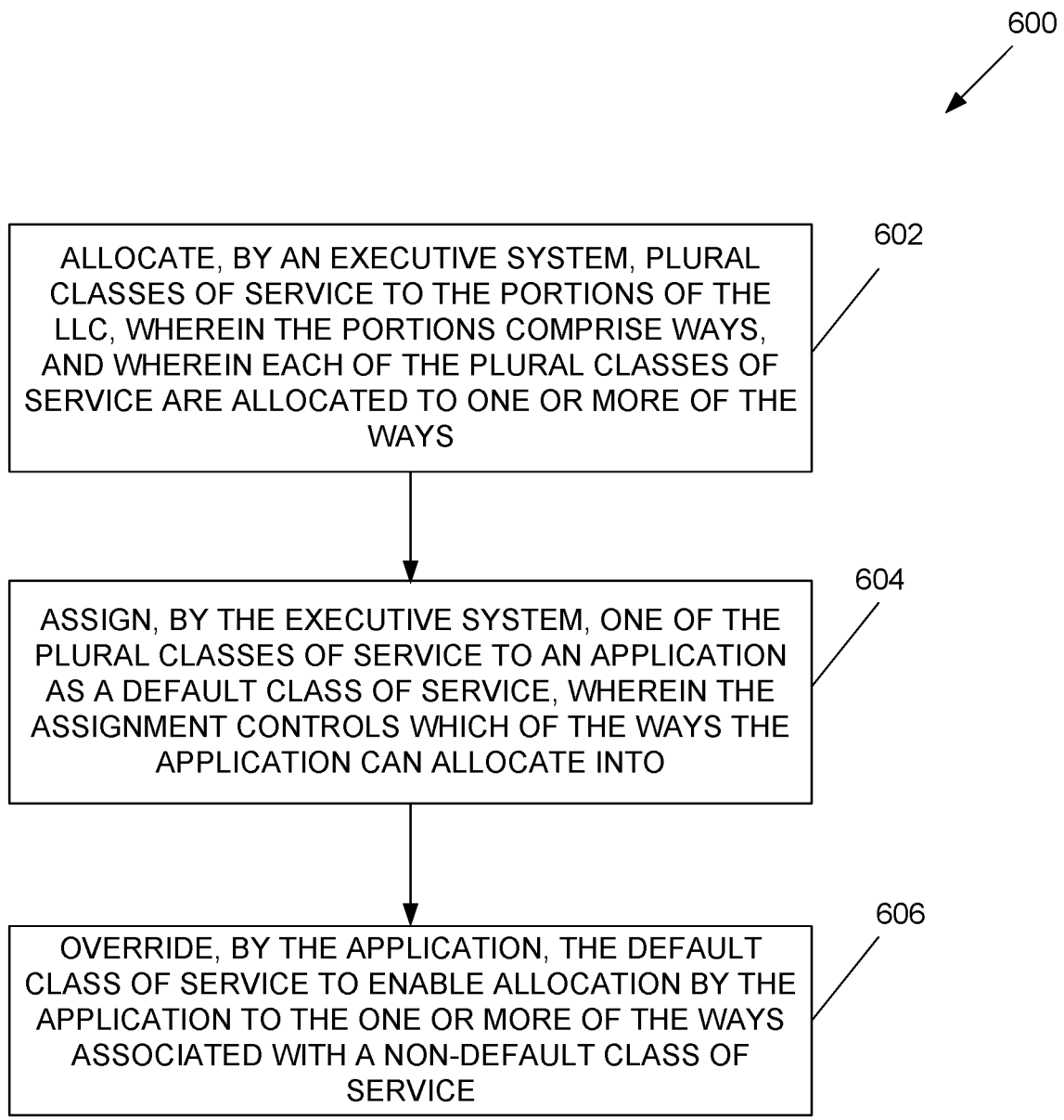
FIG. 6 is a flow diagram that illustrates an embodiment of an example CAT aware load and software prefetches method.

In view of the above description, it should be appreciated by one having ordinary skill in the art that one embodiment of a method of selectively reserving portions of a last level cache (LLC) for a multi-core processor, as shown in FIG. 6 and denoted as method 600, comprises: allocating, by an executive system, plural classes of service to the portions of the LLC, wherein the portions comprise ways, and wherein each of the plural classes of service are allocated to one or more of the ways (602); assigning, by the executive system, one of the plural classes of service to an application as a default class of service, wherein the assignment controls which of the ways the application can allocate into (604); and overriding, by the application, the default class of service to enable allocation by the application to the one or more of the ways associated with a non-default class of service (606).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, or one or more of the blocks may be omitted, depending on the functionality involved, as would be understood by those reasonably skilled in the art of the present disclosure. For instance, the method 600 in FIG. 6 may be performed by the microprocessor (e.g., cores of the microprocessor). In some embodiments, the method 600 may be performed using a control unit, decoder, or cache management controller.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A method of selectively reserving portions of a last level cache (LLC) for a multi-core processor, the method comprising:
    allocating, by an executive system, plural classes of service to the portions of the LLC, wherein the portions comprise ways, and wherein each of the plural classes of service are allocated to one or more of the ways;
    assigning, by the executive system, one of the plural classes of service to an application configured to run on a core of the multi-core processor as a default class of service, wherein the assignment controls which of the ways the application can allocate into; and
    overriding, by the application, the default class of service to enable allocation by the application to the one or more of the ways associated with another of the allocated plural classes of services.

2. The method of claim 1, wherein the overriding of the default class of service comprises adding a prefix to an instruction.

3. The method of claim 2, wherein the instruction comprises a load or store instruction.

4. The method of claim 2, wherein the instruction comprises a software prefetch instruction.

5. The method of claim 1, wherein the default class of service is associated with a first core and the another of the plural classes of service is associated with a second core.

6. The method of claim 1, wherein the executive system comprises an operating system or hypervisor/virtual machine manager.

7. The method of claim 1, wherein the allocating, by the executive system, the plural classes of service to the portions of the LLC comprises using a class of service bitmask.

8. The method of claim 1, wherein the assigning, by the executive system, the one of the plural classes of service comprises using a virtual class of service table.

9. The method of claim 8, wherein the virtual class of service table comprises a mapping of a virtual class of service to a class of service, wherein the virtual class of service of 0 is the default class of service.

10. The method of claim 1, wherein the last level cache comprises third level (L3) cache, the LLC cache comprising an inclusive cache shared by plural cores of the multi-core processor.

11. A multi-core processor, comprising:
- a last level cache (LLC) partitioned into ways, wherein the multi-core processor is configured to:
- allocate, by an executive system, plural classes of service to the ways of the LLC, and wherein each of the plural classes of service are allocated to one or more of the ways;
- assign, by the executive system, one of the plural classes of service to an application configured to run on a core of the multi-core processor as a default class of service, wherein the assignment controls which of the ways the application can allocate into; and
- override, by the application, the default class of service to enable allocation by the application to the one or more of the ways associated with another of the allocated plural classes of services.

12. The multi-core processor of claim 11, wherein the override is based on adding a prefix to an instruction.

13. The multi-core processor of claim 12, wherein the instruction comprises a load or store instruction.

14. The multi-core processor of claim 12, wherein the instruction comprises a software prefetch instruction.

15. The multi-core processor of claim 11, wherein the default class of service is associated with a first core and the another of the plural classes of service is associated with a second core.

16. The multi-core processor of claim 11, wherein the executive system comprises an operating system or hypervisor/virtual machine manager.

17. The multi-core processor of claim 11, wherein the allocation is according to a class of service bitmask.

18. The multi-core processor of claim 11, wherein the assigning is according to a virtual class of service table.

19. The multi-core processor of claim 18, wherein the virtual class of service table comprises a mapping of a virtual class of service to a class of service, wherein the virtual class of service of 0 is the default class of service.

20. The multi-core processor of claim 11, wherein the last level cache comprises third level (L3) cache, the LLC cache comprising an inclusive cache shared by plural cores of the multi-core processor.

* * * * *